US012026842B1

(12) United States Patent
Mayoral

(10) Patent No.: US 12,026,842 B1
(45) Date of Patent: Jul. 2, 2024

(54) HEADBAND-MOUNTED DUAL CAMERA SYSTEM

(71) Applicant: Armando Mayoral, Philadelphia, PA (US)

(72) Inventor: Armando Mayoral, Philadelphia, PA (US)

(*) Notice: Subject to any disclaimer, the term of this patent is extended or adjusted under 35 U.S.C. 154(b) by 50 days.

(21) Appl. No.: 17/959,364

(22) Filed: Oct. 4, 2022

(51) Int. Cl.
G06T 19/00 (2011.01)
H04N 7/18 (2006.01)

(52) U.S. Cl.
CPC .......... *G06T 19/006* (2013.01); *H04N 7/181* (2013.01)

(58) Field of Classification Search
CPC .............. G06T 19/006; H04N 7/181
See application file for complete search history.

(56) References Cited

U.S. PATENT DOCUMENTS

| 8,531,592 | B2 | 9/2013 | Teetzel |
| 8,593,570 | B2 | 11/2013 | Boland |
| 9,038,870 | B2 | 5/2015 | Johnson |
| 9,648,277 | B2 | 5/2017 | Edwards |
| 10,110,805 | B2 | 10/2018 | Pomerantz |
| 2010/0328471 | A1 | 12/2010 | Boland |
| 2014/0009606 | A1 | 1/2014 | Puccio |
| 2021/0258555 | A1* | 8/2021 | Leiby ................ H04N 19/517 |

FOREIGN PATENT DOCUMENTS

WO  2010054245  5/2010

* cited by examiner

Primary Examiner — Michael E Teitelbaum
(74) Attorney, Agent, or Firm — Kyle A. Fletcher, Esq.

(57) ABSTRACT

The headband-mounted dual camera system is worn on the head of a client. The headband-mounted dual camera system forms a communication link between the client and a personal data device. The headband-mounted dual camera system captures images from the environment surrounding the client. The headband-mounted dual camera system transmits the captured images over the communication link. The headband-mounted dual camera system comprises a head mount and a control circuit. The control circuit mounts on the head mount.

9 Claims, 5 Drawing Sheets

HEADBAND-MOUNTED DUAL CAMERA SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of control of cameras comprising an electronic image sensor comprising further processing of the captured image without influencing the image pickup process. (H04N5/23229)

SUMMARY OF INVENTION

The headband-mounted dual camera system is worn on the head of a client. The headband-mounted dual camera system forms a communication link between the client and a personal data device. The headband-mounted dual camera system captures images from the environment surrounding the client. The headband-mounted dual camera system transmits the captured images over the communication link. The headband-mounted dual camera system comprises a head mount and a control circuit. The control circuit mounts on the head mount.

These together with additional objects, features and advantages of the headband-mounted dual camera system will be readily apparent to those of ordinary skill in the art upon reading the following detailed description of the presently preferred, but nonetheless illustrative, embodiments when taken in conjunction with the accompanying drawings.

In this respect, before explaining the current embodiments of the headband-mounted dual camera system in detail, it is to be understood that the headband-mounted dual camera system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the headband-mounted dual camera system.

It is therefore important that the claims be regarded as including such equivalent construction insofar as they do not depart from the spirit and scope of the headband-mounted dual camera system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
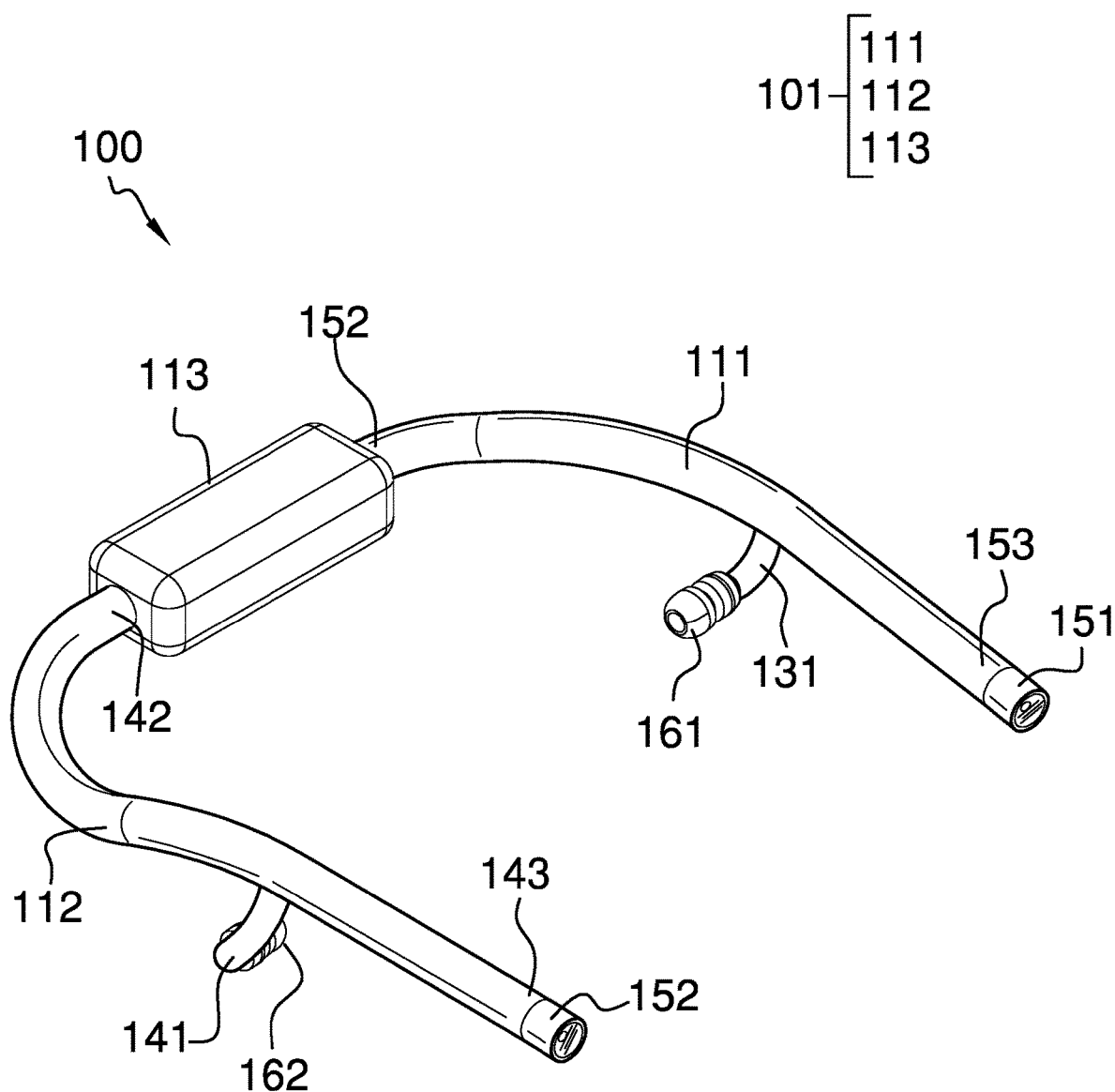
FIG. 1 is a perspective view of an embodiment of the disclosure.
Figure 2:
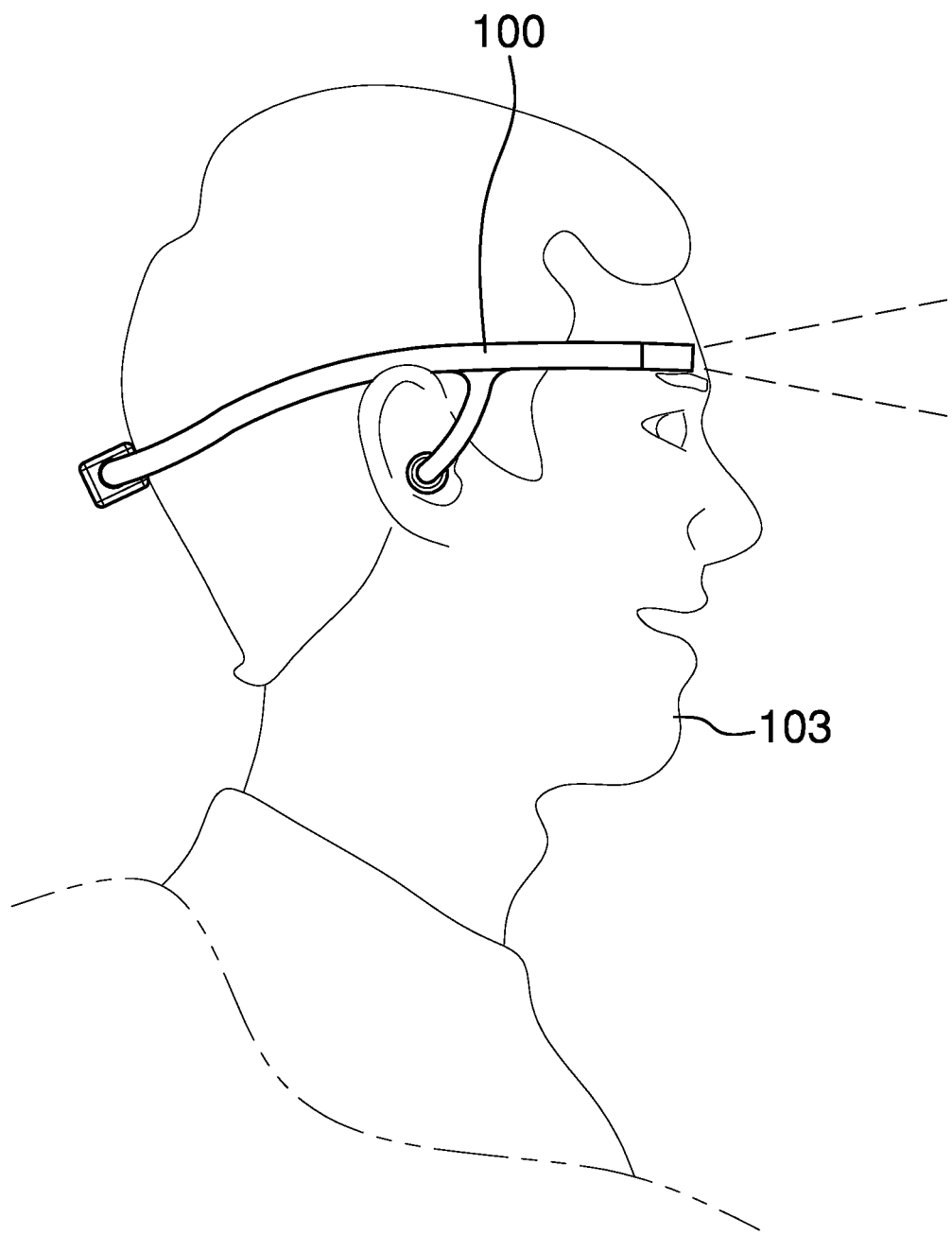
FIG. 2 is a side view of an embodiment of the disclosure.
Figure 3:
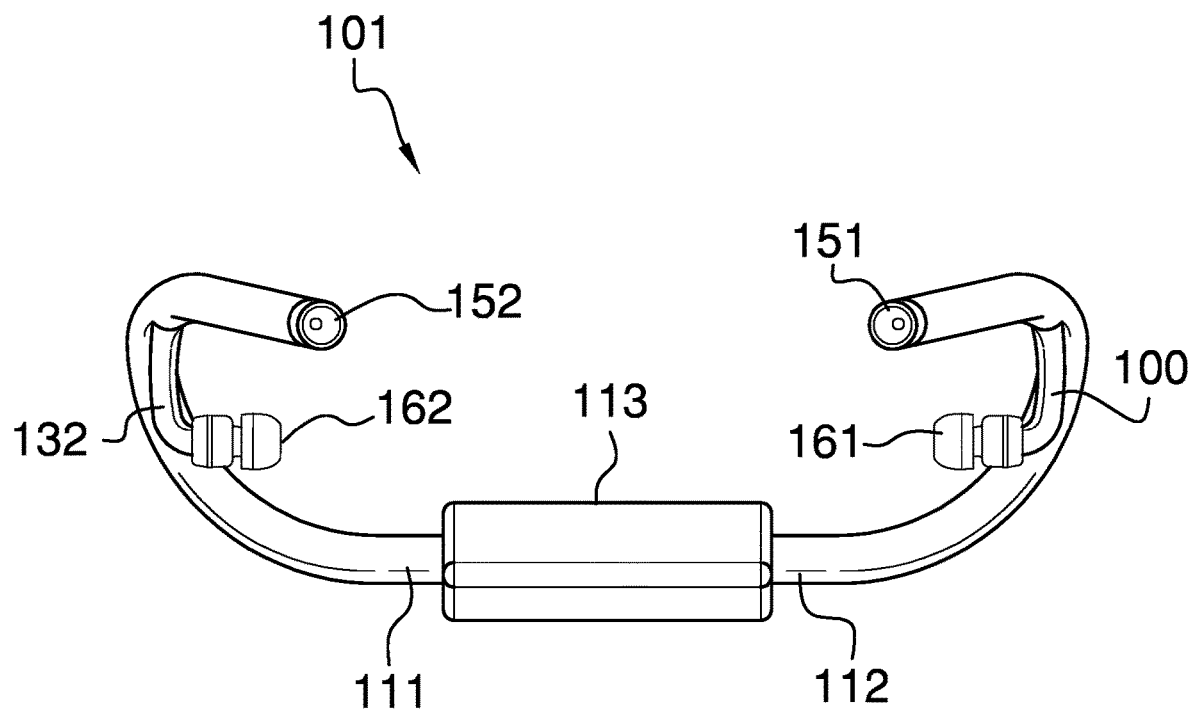
FIG. 3 is a front view of an embodiment of the disclosure.
Figure 4:
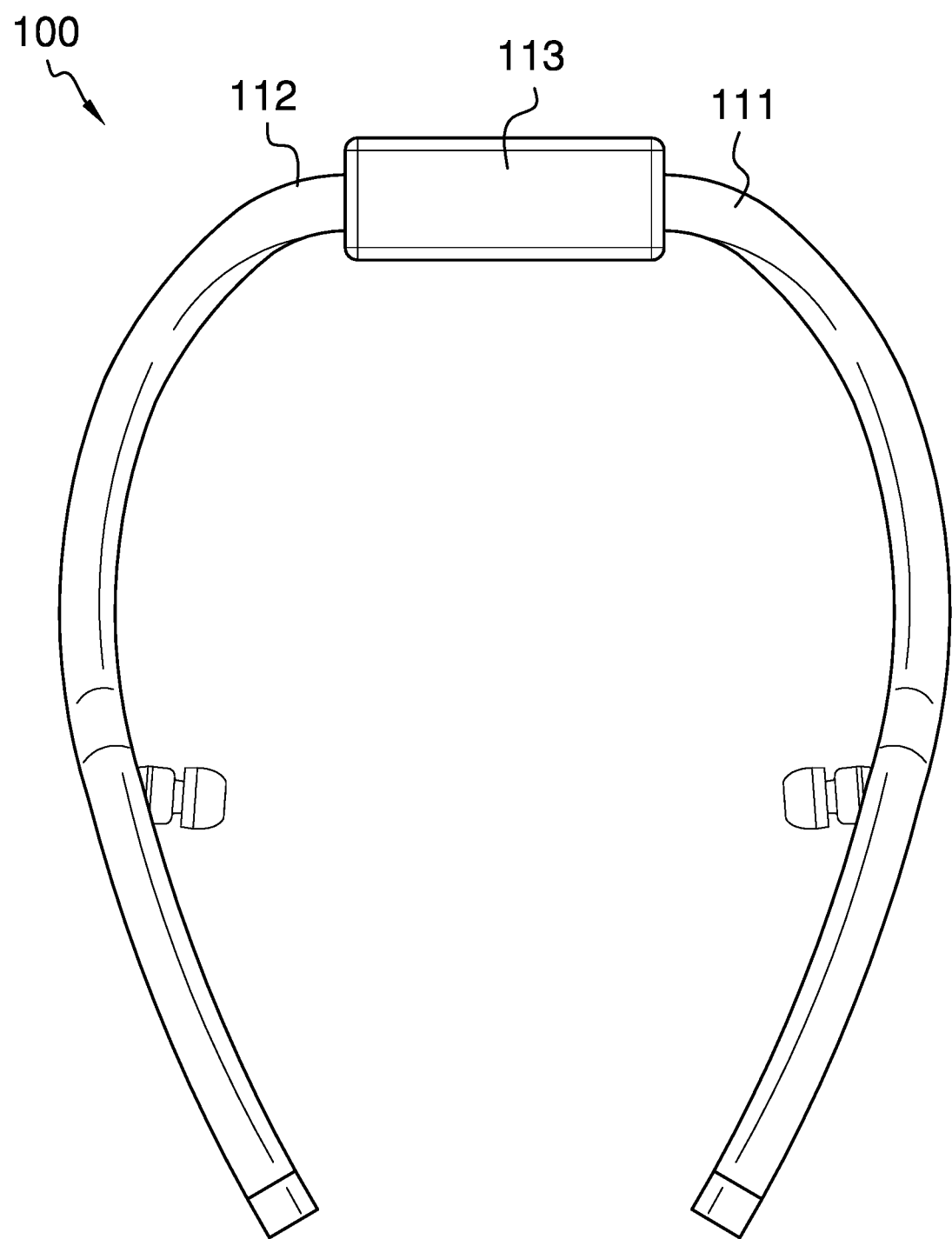
FIG. 4 is a top view of an embodiment of the disclosure.
Figure 5:
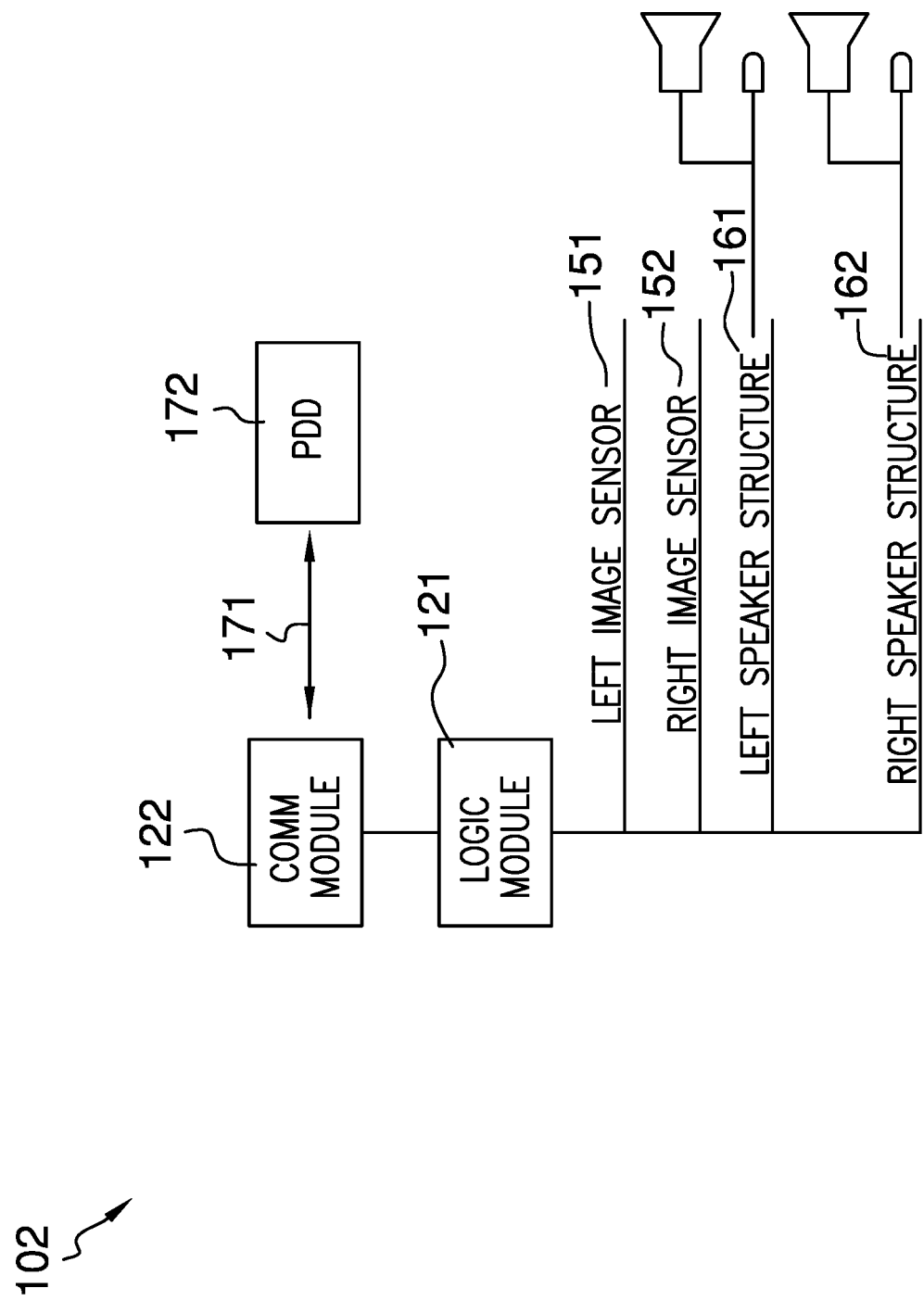
FIG. 5 is a schematic view of an embodiment of the disclosure.

Detailed reference will now be made to one or more potential embodiments of the disclosure, which are illustrated in FIGS. 1 through 5.

The headband-mounted dual camera system 100 (hereinafter invention) is worn on the head of a client 103. The invention 100 forms a communication link between the client 103 and a personal data device 172. The invention 100 captures images from the environment surrounding the client 103. The invention 100 transmits the captured images over the communication link. The invention 100 comprises a head mount 101 and a control circuit 102. The control circuit 102 mounts on the head mount 101. The client 103 is defined elsewhere in this disclosure.

The head mount 101 is a mechanical structure. The head mount 101 attaches to the head of the client 103 in the manner of a garment. The head mount 101 is an adjustable structure. By adjustable structure is meant that the form factor of the head mount 101 can be adjusted to conform to the head of the client 103. The head mount 101 rests on the ear of the client 103. The head mount 101 comprises a left wrap 111, a right wrap 112, and a control circuit 102 housing 113. The left wrap 111 attaches to the control circuit 102 housing 113. The right wrap 112 attaches to the control circuit 102 housing 113.

The left wrap 111 is a prism shaped structure. The left wrap 111 is a flexible structure. The left wrap 111 attaches to the control circuit 102 housing 113 in the manner of a cantilever. The left wrap 111 is a bimodal flexible structure. The bimodal flexible structure of the left wrap 111 allows the left wrap 111 to be bent into a non-Euclidean structure. The bimodal flexible structure of the left wrap 111 allows the form factor of the left wrap 111 to be customized to fit the head of the client 103. The left wrap 111 further comprises a left earwig drop 131, a left fixed end 132, and a left free end 133.

The left earwig drop 131 is a prism shaped structure. The left earwig drop 131 is a flexible structure with an inelastic nature. The left earwig drop 131 attaches to the lateral face of the prism structure of the left wrap 111. The left fixed end 132 is the congruent end of the prism structure of the left wrap 111 that attaches to the control circuit 102 housing 113. The left free end 133 is the congruent end of the prism structure of the left wrap 111 that is distal from the left fixed end 132.

The right wrap 112 is a prism shaped structure. The right wrap 112 is a flexible structure. The right wrap 112 attaches to the control circuit 102 housing 113 in the manner of a cantilever. The right wrap 112 is a bimodal flexible structure. The bimodal flexible structure of the right wrap 112 allows the right wrap 112 to be bent into a non-Euclidean structure. The bimodal flexible structure of the right wrap 112 allows the form factor of the right wrap 112 to be customized to fit the head of the client 103. The right wrap 112 further comprises a right earwig drop 141, a right fixed end 142, and a right free end 143.

The right earwig drop 141 is a prism shaped structure. The right earwig drop 141 is a flexible structure with an inelastic nature. The right earwig drop 141 attaches to the lateral face of the prism structure of the right wrap 112. The right fixed end 142 is the congruent end of the prism structure of the right wrap 112 that attaches to the control circuit 102 housing 113. The right free end 143 is the congruent end of the prism structure of the right wrap 112 that is distal from the right fixed end 142.

The left wrap 111 and the right wrap 112 combine to secure the invention 100 to the client 103. The left wrap 111 is supported on the left ear of the client 103. The left wrap 111 is positioned such that the left wrap 111 presses against the head of the client 103. The right wrap 112 is supported on the right ear of the client 103. The right wrap 112 is positioned such that the left wrap 111 presses against the head of the client 103.

The control circuit 102 housing 113 is a rigid housing. The control circuit 102 housing 113 contains the control circuit 102. The control circuit 102 housing 113 is formed with all the apertures and form factors to allow the control circuit 102 housing 113 to accommodate the operation of the control circuit 102.

The control circuit 102 is an electric circuit. The control circuit 102 forms a communication link with a personal data device 172. The control circuit 102 captures a plurality of images from a plurality of image sensors. The control circuit 102 transmits the plurality of images to a personal data device 172. The control circuit 102 receives an electric signal containing an audible message from the personal data device 172. The control circuit 102 announces the audible message to the client 103. The control circuit 102 captures audible sounds from the environment surrounding the client 103. The control circuit 102 converts the captured audible sounds into an audio file. The control circuit 102 transmits the audio file to the personal data device 172. The control circuit 102 comprises a logic module 121 and a communication module 122. The logic module 121 and the communication module 122 are electrically connected. The logic module 121 controls the operation of the communication module 122.

The logic module 121 is a readily and commercially available programmable electronic device that is used to manage, regulate, and operate the control circuit 102. The communication module 122 is a wireless electronic communication device that allows the logic module 121 to wirelessly communicate with a personal data device 172.

The communication module 122 exchanges one or more direct messaging facilities that are transmitted over the wireless communication link 171 to the personal data device 172. The message contained in the direct messaging facility contains the plurality of images captured by the logic module 121 and interface communication between the client 103 and the personal data device 172. The communication module 122 further comprises a wireless communication link 171 and a personal data device 172. The communication module 122 forms the wireless communication link 171 with the personal data device 172.

The personal data device 172 is a programmable electrical device. The personal data device 172 further comprises an application. The personal data device 172 provides data management and communication services through one or more functions referred to as an application. The application is a set of logical operating instructions that are performed by the personal data device 172. The addition of an application will provide increased functionality for the personal data device 172. This disclosure assumes that an application exists for the purpose of interacting with the invention 100. Methods to design and implement an application on a personal data device 172 are well known and documented in the electrical arts. The application of the personal data device 172 forms an interface between the control circuit 102 and a personal data device 172 using the invention 100. The personal data device 172 transmits operating instructions over the wireless communication link 171 to the control circuit 102. The communication module 122 receives the transmitted operating instructions and relays the received operating instructions to the logic module 121.

The logic module 121 captures a plurality of images from a plurality of image sensors. The logic module 121 transmits the plurality of images to the communication module 122. The logic module 121 receives an electric signal containing an audible message from the communication module 122. The logic module 121 announces the audible message to the client 103. The logic module 121 captures audible sounds from the environment surrounding the client 103. The logic module 121 converts the captured audible sounds into an audio file. The logic module 121 transmits the audio file to the communication module 122.

The logic module 121 further comprises a left image sensor 151, a right image sensor 152, a left speaker structure 161, and the right speaker structure 162. The left image sensor 151 electrically connects to the logic module 121. The logic module 121 controls the operation of the left image sensor 151. The right image sensor 152 electrically connects to the logic module 121. The logic module 121 controls the operation of the right image sensor 152. The left speaker structure 161 electrically connects to the logic module 121. The logic module 121 controls the operation of the left speaker structure 161. The right speaker structure 162 electrically connects to the logic module 121. The logic module 121 controls the operation of the right speaker structure 162.

The left image sensor 151 is an electric device. The left image sensor 151 mounts on the left free end 133 of the left wrap 111. The left image sensor 151 captures electromagnetic radiation from a field of view that is anterior to the client 103. The left image sensor 151 converts the captured electromagnetic radiation into an electric signal that is processed by the logic module 121. The logic module 121 converts the received electric signal into the plurality of images.

The right image sensor 152 is an electric device. The right image sensor 152 mounts on the right free end 143 of the right wrap 112. The right image sensor 152 captures electromagnetic radiation from a field of view that is anterior to the client 103. The right image sensor 152 converts the captured electromagnetic radiation into an electric signal that is processed by the logic module 121. The logic module 121 converts the received electric signal into the plurality of images.

The left speaker structure 161 is a transducer. The transducer is defined elsewhere in this disclosure. The left speaker structure 161 is formed with a left speaker and a left microphone. The left speaker structure 161 the left speaker electrically connects to the logic module 121. The left speaker structure 161 the left microphone electrically connects to the logic module 121. The left speaker of the left speaker structure 161 receives an electric signal containing an audible message from the logic module 121. The left speaker announces the audible message into the ear of the client. The left microphone of the left speaker structure 161 captures acoustic energy from the environment surrounding the client 103. The left microphone converts the captured acoustic energy into an electric signal.

The left speaker structure 161 attaches to the congruent end of the prism structure of the left earwig drop 131 that is distal from the left wrap 111. The left speaker structure 161 is positioned along the left wrap 111 such that the left speaker structure 161 is positioned at a location proximal to the left ear of the client 103.

The right speaker structure 162 is a transducer. The transducer is defined elsewhere in this disclosure. The right speaker structure 162 is formed with a right speaker and a right microphone. The right speaker structure 162 the right speaker electrically connects to the logic module 121. The right speaker structure 162 the right microphone electrically connects to the logic module 121. The right speaker of the right speaker structure 162 receives an electric signal containing an audible message from the logic module 121. The right speaker announces the audible message into the ear of the client. The right microphone of the right speaker structure 162 captures acoustic energy from the environment surrounding the client 103. The right microphone converts the captured acoustic energy into an electric signal.

The right speaker structure 162 attaches to the congruent end of the prism structure of the right earwig drop 141 that is distal from the right wrap 112. The right speaker structure 162 is positioned along the right wrap 112 such that the right speaker structure 162 is positioned at a location proximal to the right ear of the client 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Application or App: As used in this disclosure, an application or app is a self-contained piece of software that is especially designed or downloaded for use with a personal data device.

Announce: As used in this disclosure, to announce means to generate audible sounds over a transducer.

At a Location Proximal to: As used in this disclosure, the term "at a location proximal to" identifies the position of a first object relative to a second object. The first object is placed at the location proximal to the second object. By at a location proximal too is meant that the span of the distance between the first object and the second object is such that the second object benefits from the services provided by the first object.

Bimodal Flexible Structure: As used in this disclosure, a bimodal flexible structure is a structure that: a) responds to forces that are applied to one or more dimensional axes of the bimodal flexible structure in the manner of a rigid structure; while, b) simultaneously responding to forces that are applied to a dimensional axis that is perpendicular to the one or more dimensional axes described in (a) in the manner of a semi-rigid structure with an inelastic nature. A conduit structure is an example of a bimodal flexible structure. Specifically, a conduit structure acts as a rigid structure to forces that are applied in a radial direction towards the center axis of the prism structure of the conduit structure while being allowing the prism structure of the conduit to bend such that the conduit can be shaped into a non-Euclidean prism. A drafting spline is another example of a bimodal flexible structure. The resistance of a wire to compressive forces along the center axis of the wire allows a wire to behave as a bimodal flexible structure.

Bluetooth™: As used in this disclosure, Bluetooth™ is a standardized communication protocol that is used to wirelessly interconnect electronic devices.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Client: As used in this disclosure, a client is an individual who is designated to receive the services of the disclosure at bar.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Ear: As used in this disclosure, the ear is a sensory organ commonly found in animals, including human beings. The ear detects vibrations that are propagated through the atmosphere. The ear is found in the head of a human being. The visible portion of the human ear is called the auricle. The ear canal is a tubular structure that leads from the auricle to the sensing structures of the ear.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Eye: As used in this disclosure, the eye is a sensory organ commonly found in animals, including human beings. The eye detects electromagnetic radiation. The eye is found in the head of a human being. The transparent exterior surface of the eye is called the cornea.

Face: As used in this disclosure, the face is the anterior portion of the head formed from the inferior surface of the mandible to the center of the frontal bone of the skull. The eyes, nose, and mouth of a person are located in the face.

Field of View: As used in this disclosure, a field of view refers to one or more angles which delimits an area from which electromagnetic radiation will be sensed by a person or an image sensor.

Fixed and Free End: As used in this disclosure, a fixed end refers to the congruent end of a first prism shaped structure that is secured to an anchor point of a primary structure. A free end refers to the congruent end of a first prism shaped structure: a) that is distal from the fixed end; and, b) that is not secured to the primary structure. The free end of the sheeting structure can be secured to a secondary structure that is independent of the primary structure.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Head: As used in this disclosure, the head refers to the structures of a body that are associated with a skull.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition. See Label.

Image Sensor: As used in this disclosure, an image sensor detects electromagnetic light from the exterior of the image sensor and converts the detected electromagnetic radiation into a digital representation of sufficient detail to allow a logic module to create and display a visual reproduction of the source of the captured electromagnetic radiation.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Messaging Facility: As used in this disclosure, a messaging facility a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but are not limited to, postal delivery. Examples of a direct messaging facilities include, but are not limited to, email and SMS messages. A social media service is an example of a broadcast messaging facility.

Microphone: As used in this disclosure, a microphone is a transducer that converts the energy from vibration into electrical energy. The sources of vibrations include, but are not limited to, acoustic energy.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Nose: As used in this disclosure, the nose is a sensory organ commonly found in animals, including human beings. The nose detects chemicals that are found in the atmosphere. The nose is found in the head of a human being.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Skull: As used in this disclosure, the skull refers to a bone structure that encloses the brain of a human body. The skull comprises six primary cranial bones and a plurality of other bones. The six primary cranial bones comprise: the frontal bone, the left parietal bone, the right parietal bone, the left temporal bone, the right temporal bone, and the occipital bone. The frontal bone forms the superior anterior enclosure of approximately anterior portions of the brain. The left parietal bone encloses the left posterior region from the superior side. The right parietal bone encloses the right posterior region from the superior side. The left temporal bone encloses the left posterior region from the inferior side. The right temporal bone encloses the right posterior region from the inferior side. The occipital bone encloses the posterior region of the brain from the inferior side. The left temple is the location of the skull where the frontal bone, the left parietal bone, and the left temporal bone are joined. The right temple is the location of the skull where the frontal bone, the right parietal bone, and the right temporal bone are joined.

Speaker: As used in this disclosure, a speaker is an electrical transducer that converts an electrical signal into an audible sound.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Transducer: As used in this disclosure, a transducer is a device that converts a physical quantity, such as pressure or brightness into an electrical signal or a device that converts an electrical signal into a physical quantity.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A headband-mounted dual camera system comprising a head mount and a control circuit;
wherein the control circuit mounts on the head mount;
wherein the headband-mounted dual camera system is adapted to be worn on the head of a client;
wherein the headband-mounted dual camera system forms a communication link between the client and a personal data device;
wherein the headband-mounted dual camera system captures images from the environment surrounding the client;
wherein the headband-mounted dual camera system transmits the captured images over the communication link;
wherein the head mount comprises a left wrap, a right wrap, and a control circuit housing;
wherein the control circuit comprises a logic module and a communication module;
wherein the logic module captures a plurality of images from a plurality of image sensors;
wherein the logic module transmits the plurality of images to the communication module;
wherein the logic module receives an electric signal containing an audible message from the communication module;
wherein the logic module is adapted to announce the audible message to the client;
wherein the left wrap is a flexible structure;
wherein the left wrap attaches to the control circuit housing in the manner of a cantilever;
wherein the left wrap is a bimodal flexible structure;
wherein the bimodal flexible structure of the left wrap allows the left wrap to be bent into a non-Euclidean structure;
wherein the bimodal flexible structure of the left wrap allows the form factor of the left wrap to be customized to fit the head of the client;
wherein the right wrap is a flexible structure;
wherein the right wrap attaches to the control circuit housing in the manner of a cantilever;
wherein the right wrap is a bimodal flexible structure;
wherein the bimodal flexible structure of the right wrap allows the right wrap to be bent into a non-Euclidean structure;
wherein the bimodal flexible structure of the right wrap allows the form factor of the right wrap to be customized to fit the head of the client.

2. The headband-mounted dual camera system according to claim 1
wherein the head mount is a mechanical structure;
wherein the head mount is adapted to be attached to the head of the client;
wherein the head mount is an adjustable structure;
wherein the head mount is adapted to rest on the ears of the client.

3. The headband-mounted dual camera system according to claim 2
wherein the left wrap attaches to the control circuit housing;
wherein the right wrap attaches to the control circuit housing.

4. The headband-mounted dual camera system according to claim 3
wherein the logic module and the communication module are electrically connected;
wherein the logic module controls the operation of the communication module;
wherein the logic module captures audible sounds from the environment surrounding the client;
wherein the logic module converts the captured audible sounds into an audio file;
wherein the logic module transmits the audio file to the communication module.

5. The headband-mounted dual camera system according to claim 4
wherein the left wrap and the right wrap combine to secure the headband-mounted dual camera system to the client;
wherein the left wrap is supported on the left ear of the client;
wherein the left wrap is positioned such that the left wrap presses against the head of the client;
wherein the right wrap is supported on the right ear of the client;
wherein the right wrap is positioned such that the left wrap presses against the head of the client.

6. The headband-mounted dual camera system according to claim 5
wherein the control circuit housing is a rigid housing;
wherein the control circuit housing contains the control circuit.

7. The headband-mounted dual camera system according to claim 6
wherein the left wrap further comprises a left earwig drop, a left fixed end, and a left free end;
wherein the left earwig drop is a flexible structure with an inelastic nature;
wherein the left earwig drop attaches to the lateral face of the left wrap;
wherein the left fixed end is the congruent end of the left wrap that attaches to the control circuit housing;
wherein the left free end is the congruent end of the left wrap that is distal from the left fixed end;
wherein the right wrap further comprises a right earwig drop, a right fixed end, and a right free end;
wherein the right earwig drop is a flexible structure with an inelastic nature;
wherein the right earwig drop attaches to the lateral face of the right wrap;
wherein the right fixed end is the congruent end of the right wrap that attaches to the control circuit housing;
wherein the right free end is the congruent end of the right wrap that is distal from the right fixed end.

8. The headband-mounted dual camera system according to claim 7
wherein the control circuit is an electric circuit; wherein the control circuit forms a communication link with a personal data device;
wherein the control circuit captures a plurality of images from a plurality of image sensors;
wherein the control circuit transmits the plurality of images to a personal data device;
wherein the control circuit receives an electric signal containing an audible message from the personal data device;

wherein the control circuit announces the audible message to the client; wherein the control circuit captures audible sounds from the environment surrounding the client;

wherein the control circuit converts the captured audible sounds into an audio file;

wherein the control circuit transmits the audio file to the personal data device.

9. The headband-mounted dual camera system according to claim 1 wherein the logic module further comprises a left image sensor, a right image sensor, a left speaker structure, and the right speaker structure;

wherein the left image sensor electrically connects to the logic module;

wherein the logic module controls the operation of the left image sensor;

wherein the right image sensor electrically connects to the logic module;

wherein the logic module controls the operation of the right image sensor;

wherein the left speaker structure electrically connects to the logic module;

wherein the logic module controls the operation of the left speaker structure;

wherein the right speaker structure electrically connects to the logic module;

wherein the logic module controls the operation of the right speaker structure;

wherein the left image sensor is an electric device;

wherein the left image sensor mounts on the left free end of the left wrap;

wherein the left image sensor captures electromagnetic radiation from a field of view that is anterior to the client;

wherein the left image sensor converts the captured electromagnetic radiation into an electric signal that is processed by the logic module;

wherein the logic module converts the received electric signal into the plurality of images;

wherein the right image sensor is an electric device;

wherein the right image sensor mounts on the right free end of the right wrap;

wherein the right image sensor captures electromagnetic radiation from a field of view that is anterior to the client;

wherein the right image sensor converts the captured electromagnetic radiation into an electric signal that is processed by the logic module;

wherein the logic module converts the received electric signal into the plurality of images;

wherein the left speaker structure is a transducer;

wherein the left speaker structure is formed with a left speaker and a left microphone;

wherein the left speaker structure the left speaker electrically connects to the logic module;

wherein the left speaker structure the left microphone electrically connects to the logic module;

wherein the left speaker of the left speaker structure receives an electric signal containing an audible message from the logic module;

wherein the left speaker announces the audible message into the ear of the client;

wherein the left microphone of the left speaker structure captures acoustic energy from the environment surrounding the client;

wherein the left microphone converts the captured acoustic energy into an electric signal;

wherein the left speaker structure attaches to the congruent end of the left earwig drop that is distal from the left wrap;

wherein the left speaker structure is positioned along the left wrap such that the left speaker structure is positioned at a location proximal to the left ear of the client;

wherein the right speaker structure is a transducer;

wherein the right speaker structure is formed with a right speaker and a right microphone;

wherein the right speaker structure the right speaker electrically connects to the logic module;

wherein the right speaker structure the right microphone electrically connects to the logic module;

wherein the right speaker of the right speaker structure receives an electric signal containing an audible message from the logic module;

wherein the right speaker announces the audible message into the ear of the client;

wherein the right microphone of the right speaker structure captures acoustic energy from the environment surrounding the client;

wherein the right microphone converts the captured acoustic energy into an electric signal;

wherein the right speaker structure attaches to the congruent end of the right earwig drop that is distal from the right wrap;

wherein the right speaker structure is positioned along the right wrap such that the right speaker structure is positioned at a location proximal to the right ear of the client.

* * * * *